(12) United States Patent
Lemke

(10) Patent No.: US 6,607,338 B2
(45) Date of Patent: Aug. 19, 2003

(54) MULTI-PURPOSE TRUCK POLE

(76) Inventor: Stuart H. Lemke, W1469 Longbasco La., Gleason, WI (US) 54435

( * ) Notice: Subject to any disclaimer, the term of this patent is extended or adjusted under 35 U.S.C. 154(b) by 0 days.

(21) Appl. No.: 09/834,257

(22) Filed: Apr. 12, 2001

(65) Prior Publication Data

US 2002/0150439 A1 Oct. 17, 2002

(51) Int. Cl.$^7$ .................................................. B60P 7/15
(52) U.S. Cl. ....................... 410/151; 410/143; 410/145; 410/152
(58) Field of Search .............................. 410/151, 143, 410/145, 152; 248/354.3, 354.5, 354.6; 211/105.3, 105.4

(56) References Cited

U.S. PATENT DOCUMENTS

| | | | | |
|---|---|---|---|---|
| 3,110,506 A | * | 11/1963 | O'Brien | |
| 4,236,854 A | * | 12/1980 | Rogers | 410/121 |
| 5,697,742 A | * | 12/1997 | House | 410/127 |
| 5,934,850 A | * | 8/1999 | Soumar et al. | 410/155 |
| 5,971,685 A | * | 10/1999 | Owens | 410/151 |
| 5,988,962 A | * | 11/1999 | Santa Cruz et al. | 410/151 |
| 5,988,963 A | * | 11/1999 | Shiau | 410/151 |
| 5,997,228 A | * | 12/1999 | Potter | 410/155 |
| 6,042,312 A | * | 3/2000 | Durham, II | 410/143 |
| 6,068,433 A | * | 5/2000 | Baloga | 410/145 |
| 6,238,154 B1 | * | 5/2001 | DaPrato | 410/151 |

* cited by examiner

Primary Examiner—Stephen T. Gordon
(74) Attorney, Agent, or Firm—Andrus, Sceales, Starke & Sawall, LLP

(57) ABSTRACT

A multi-purpose truck pole for use in a pick-up truck bed or cab having garment hooks disposed on the inner side walls of the truck includes first and second pole sections telescopically connected to each other whereby the overall length of the pole may be adjusted and locked into position. Suspension brackets at each end of the pole allow the pole to be hung from the truck's garment hooks and cargo arm is pivotally attached to one end of the pole and movable between a stored position and a utilitarian position on which the arm extends outwardly from the pole to position or retrieve cargo in the bed of the truck. A light is also disposed in one end of the pole adjacent the cargo arm to provide illumination when retrieving or positioning cargo. Retaining cups are provided on the vertical walls of the truck bed to hold the pole above the truck bed.

5 Claims, 4 Drawing Sheets

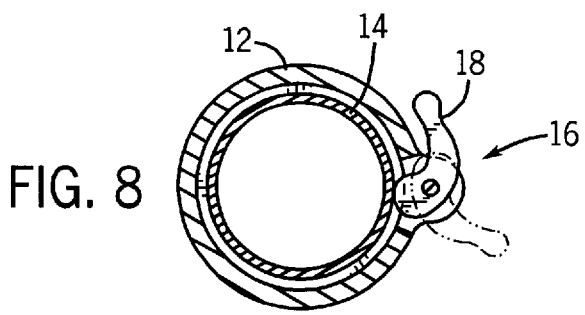
FIG. 8
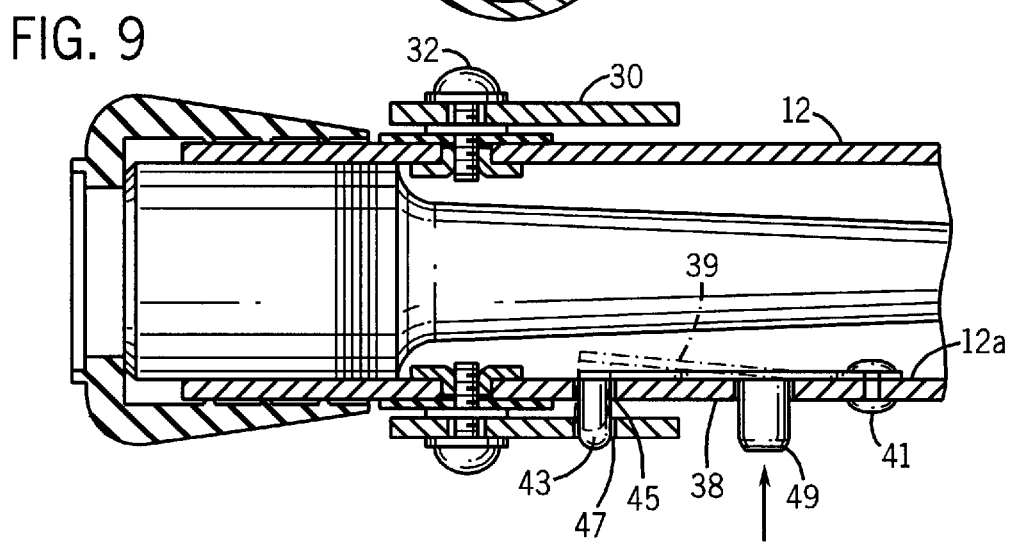
FIG. 9
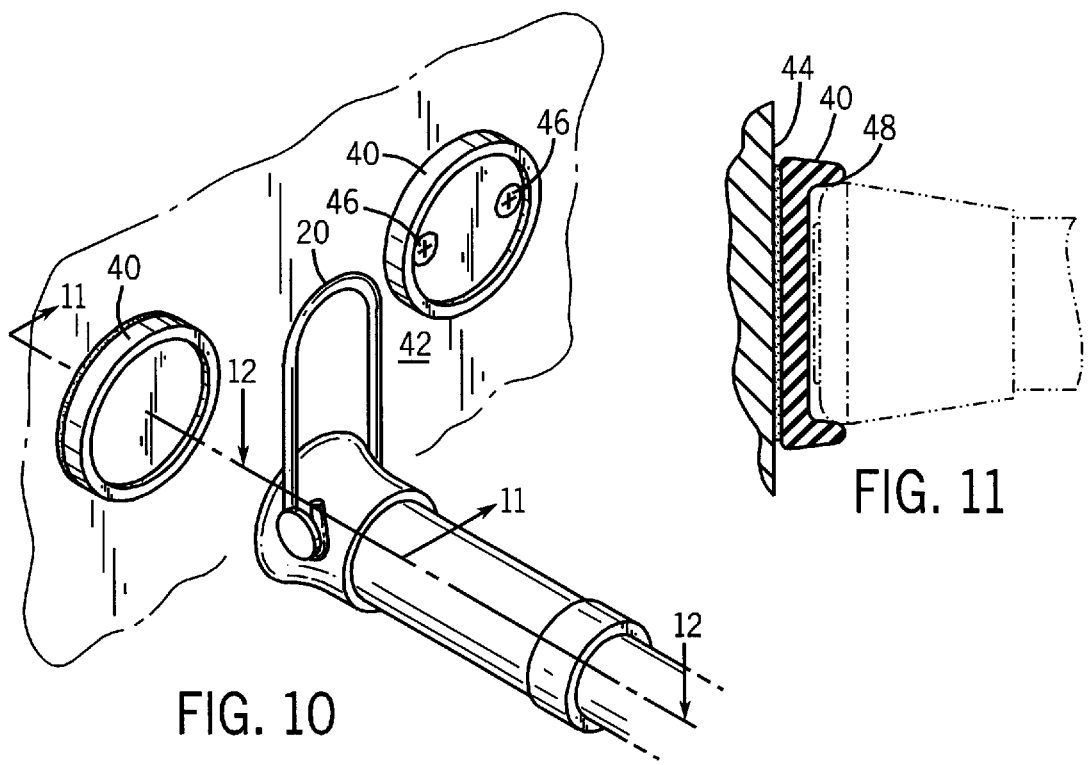
FIG. 10
FIG. 11

MULTI-PURPOSE TRUCK POLE

FIELD OF THE INVENTION

This invention relates to devices for the storage and handling of materials and more specifically to the storage and handling of cargo in the cab or bed of a pick-up truck.

BACKGROUND OF THE INVENTION

The present invention relates to a multi-purpose truck pole and more specifically to a pole for use in a pick-up truck or cab having garment hooks disposed on each side of the cab and a truck bed for storing and transporting cargo.

BRIEF SUMMARY OF THE INVENTION

An elongated multi-purpose truck pole for use in a pick-up truck bed or cab having garment hooks disposed on the inner side walls includes first and second pole sections telescopically connected to each other whereby the overall length of the pole may be adjusted.

In accordance with one aspect of the invention, locking means are provided to secure the first and second sections of the pole in position to maintain the desired pole length.

In accordance with another aspect of the invention, first and second suspension brackets are disposed at each end of the pole so that the pole may be hung from the truck's garment hooks.

In accordance with still another aspect of the invention, a cargo arm is pivotally attached to one end of the pole and movable between a stored position in which the arm is substantially adjacent and parallel to the pole and a utilitarian position in which the arm extends outwardly from the pole so that cargo in the bed of the truck may be positioned or retrieved.

In still another aspect of the invention, the pole is provided with a light disposed at the same end of the pole so that the truck bed may be illuminated while positioning or retrieving cargo.

In yet another aspect of the invention, retaining cups are provided on opposite sides of the vertical truck bed walls to engage opposite ends of the pole to maintain the pole a specified distance above the truck bed.

The present invention thus provides a multi-purpose pole that can be used as a garment hanger or a tool for illuminating, positioning or retrieving cargo from the truck bed.

Various other features, objects, and advantages of the invention will be made apparent from the following detailed description and the drawings.

BRIEF DESCRIPTION OF THE DRAWINGS

The drawings illustrate the best mode presently contemplated of carrying out the invention.

In the drawings:

FIG. 8 is a cross-sectional detailed view of the locking mechanism for the telescoping pole sections;

FIG. 9 is a sectional view along the line 9—9 of FIG. 3;

FIG. 10 is a perspective view along the line 10—10 of FIG. 6 showing the retaining cups installed on the vertical truck bed walls;

FIG. 11 is a sectional view along the line 11—11 of FIG. 10;

DETAILED DESCRIPTION OF THE INVENTION

Figure 1:
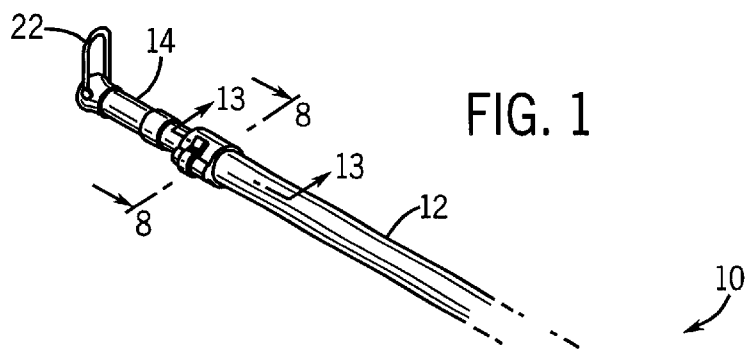
FIG. 1 is a perspective view of a truck pole constructed in accordance with the present invention.

As seen in FIG. 1, a multi-purpose truck pole 10 includes a first pole section 12 and a second pole section 14 telescopically connected to each other so that the overall length of pole 10 may be adjusted.

As seen in FIG. 8, pole 10 is provided with a locking mechanism 16 in the form of a camming lever 18 which is movable from a locked position in which a surface of the lever engages inner pole 14 to prevent its movement relative to outer pole 12 and a release position (shown in phantom) in which relative movement between inner pole 14 and outer pole 12 is allowed.

Pole 10 is also provided with a pair of suspension brackets 20 and 22 disposed at each end of pole 10 and which engage garment hooks 24 and 26 disposed on opposite sides of the truck cab or truck side walls.

Figure 5:
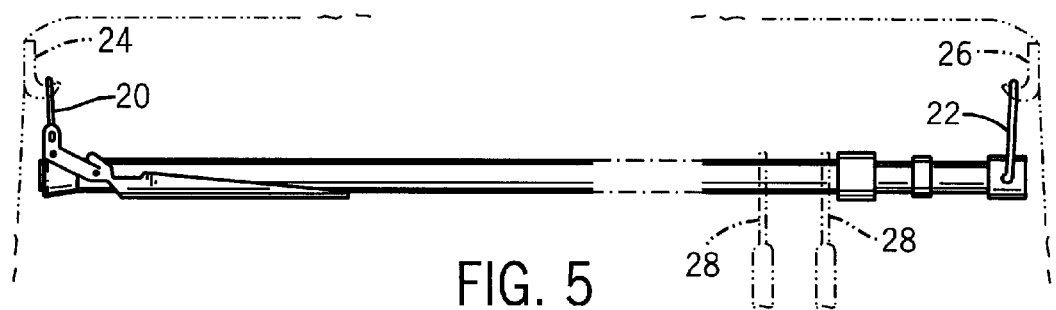
FIG. 5 is a plan view of the pole in use as a garment hanger.

As shown in FIG. 5, truck pole 10 may be suspended from garment hooks 24 and 26 to provide an elongated hanging pole for clothes hangers 28.

Figure 2:
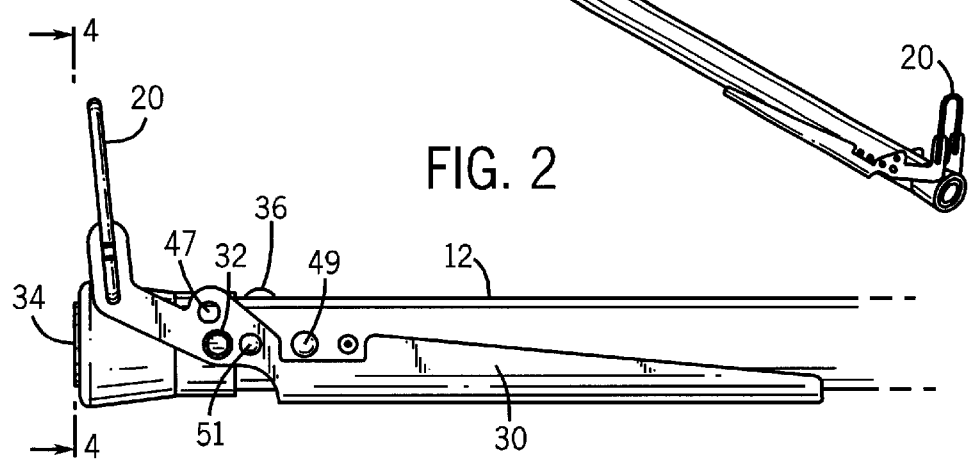
FIG. 2 is an enlarged view of one end of the pole of FIG. 1 with the cargo arm in a stored position.
Figure 3:
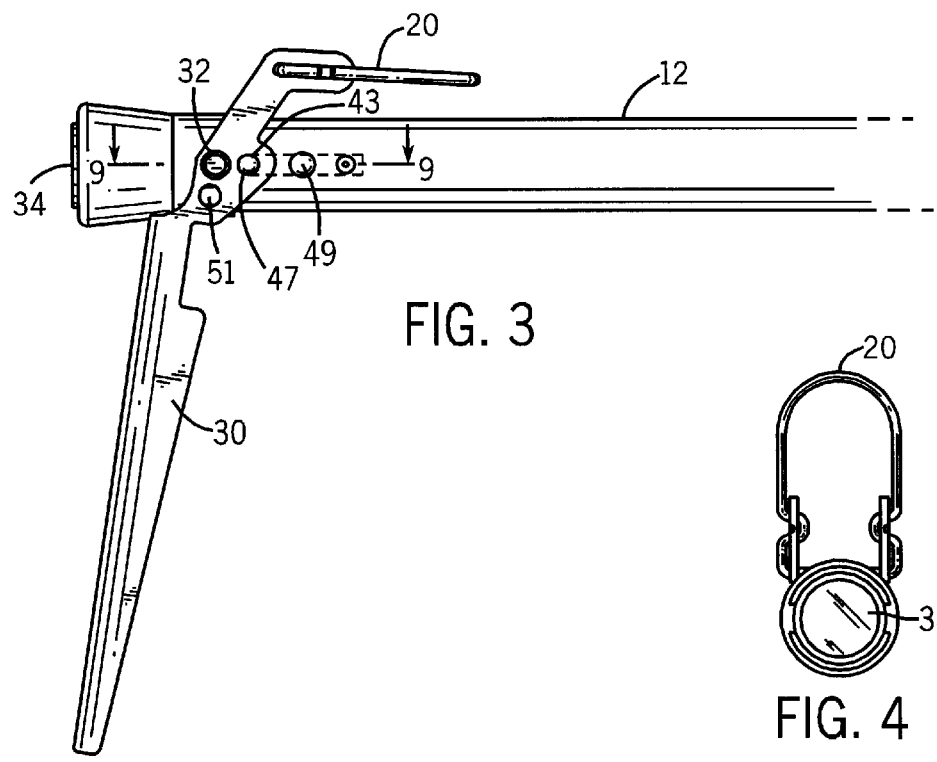
FIG. 3 is a view similar to that of FIG. 2 with the cargo arm in an extended position.
Figure 7:
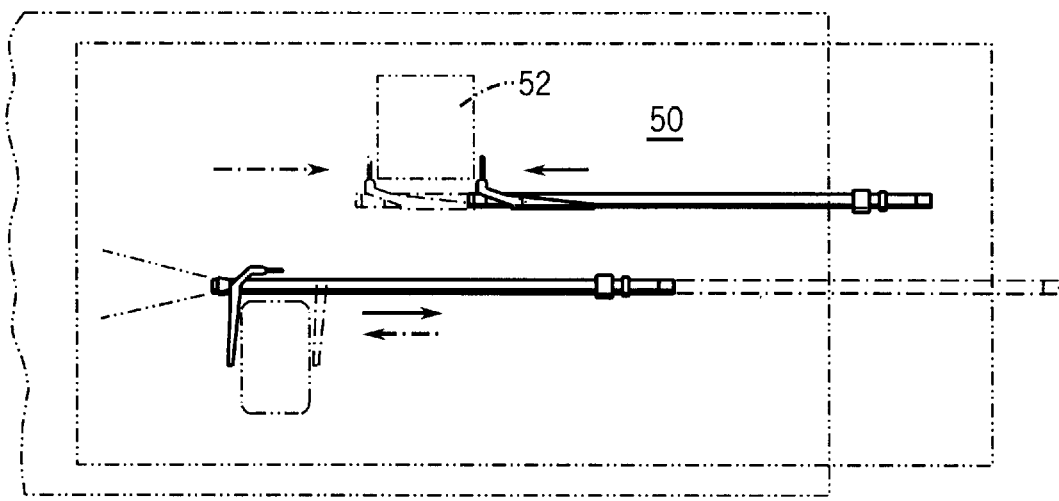
FIG. 7 is a top view of the pole being utilized as a positioning or retrieving tool for cargo located in the bed of a truck.
Figure 12:
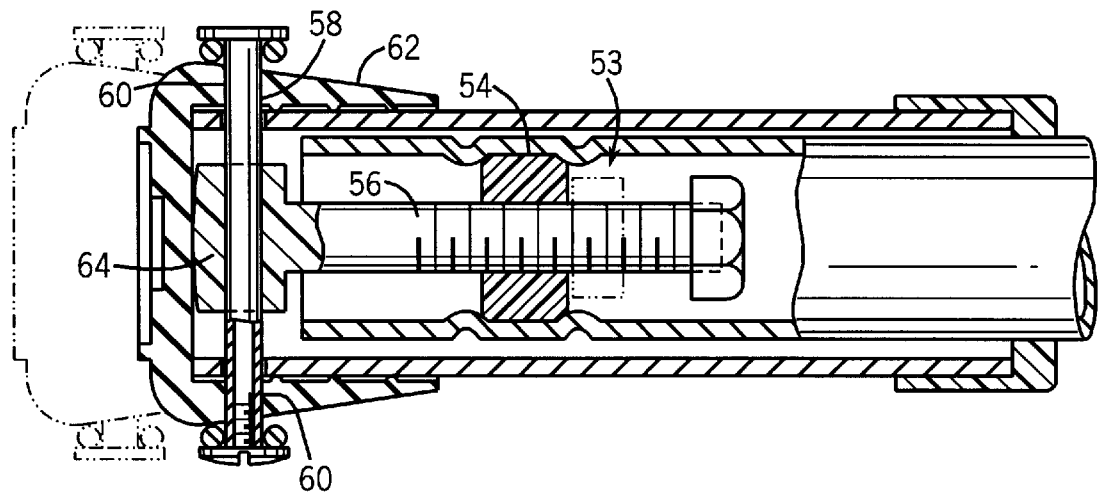
FIG. 12 is a sectional view along the line 12—12 of FIG. 10.

As shown in FIGS. 2 and 3, truck pole 10 is also provided with a cargo arm 30 that is pivotally attached to pole section 12 by a rivet 32 or other suitable fastening means. Cargo hook 30 is movable between a stored position (FIG. 2) and an operable or utilitarian position (FIG. 3) in which the hook may be used to pull or push cargo along the floor of the truck bed (FIG. 7). Cargo pole 10 is also provided with a detent mechanism 38 (FIG. 9) that engages and maintains cargo hook 30 in the desired position. Detent mechanism 38 consists of a biased lever arm 39 mounted on the inner surface of pole section 12a at 41. Lever arm 39 includes a lug 43 that protrudes through hole 45 in pole section 12 and hole 47 in cargo hook 30. Lug 43 is disengaged by pressing button 49. Cargo hook 30 is held in its stored position by engaging lug 43 with hole 51 in cargo hook 30.

Figure 4:
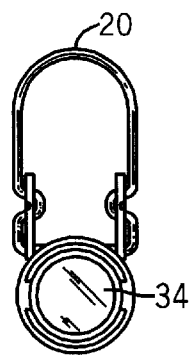
FIG. 4 is a sectional view along the line 4—4 of FIG. 2.

As shown in FIG. 4, truck pole 10 is provided with a light 34 disposed within truck pole 10 at an end adjacent cargo hook 30. Light 34 can be of the standard flashlight type and is turned on and off by switch 36.

Figure 6:
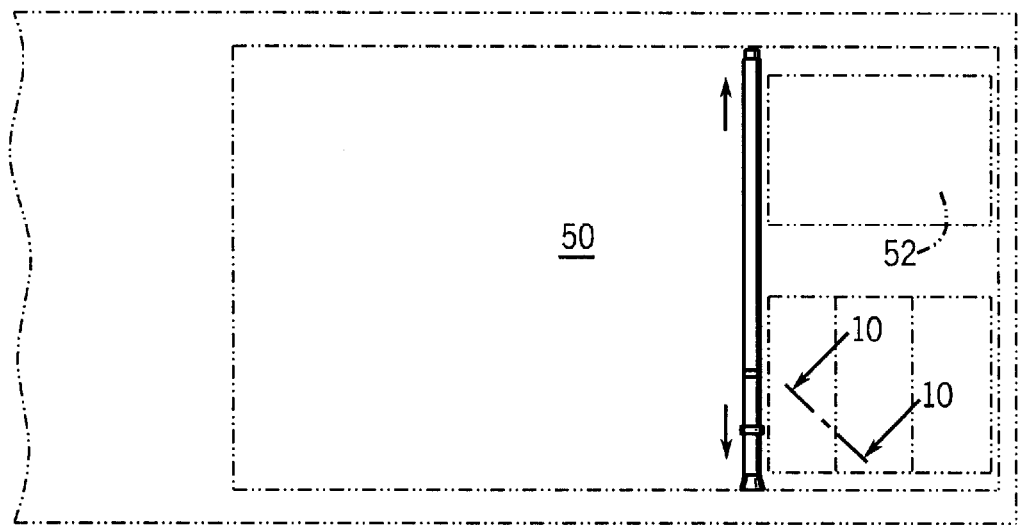
FIG. 6 is a top view of the truck pole in use as a cargo stop in the bed of a truck.

As shown in FIGS. 10 and 11, cargo pole 10 can also be provided with retaining cups 40 which can be fastened to vertical truck bed wall by means of adhesive 44 or mechanical fasteners 46. Retaining cups 40 are dimensioned to receive the end 48 of truck pole 10 and maintain truck pole 10 at a desired height above truck bed 50. While it is possible to merely expand truck pole 10 in such a fashion as to engage the side walls 42 of the truck bed, the use of retaining cups 40 prevents any slippage of the pole when forces are applied to the pole by cargo in the truck bed. Thus, truck pole 10 can be utilized to limit the movement of cargo 52 along the surface of truck bed 50 (FIG. 6).

Cargo pole 10 is also provided with an incremental length adjustment mechanism 53 located inside pole section 14 at the pole end opposite cargo hook 30. Adjustment mechanism 53 is in the form of a threaded member 54 mounted within inner section 14 and adjustment bolt 56 received by member 54 and secured to outer section 12 by means of rod 58 extending through holes 60 in pole end 62. Rod 58 is secured to adjustment bolt 56 at bracket 64. Thus, the length of cargo pole 10 may be slightly adjusted by rotation of pole end 62 to move adjustment bolt 56 in and out of threaded member 54. This adjustment can be utilized to more securely engage pole 10 with truck side walls 42 or retaining cups 40.

Figure 13:
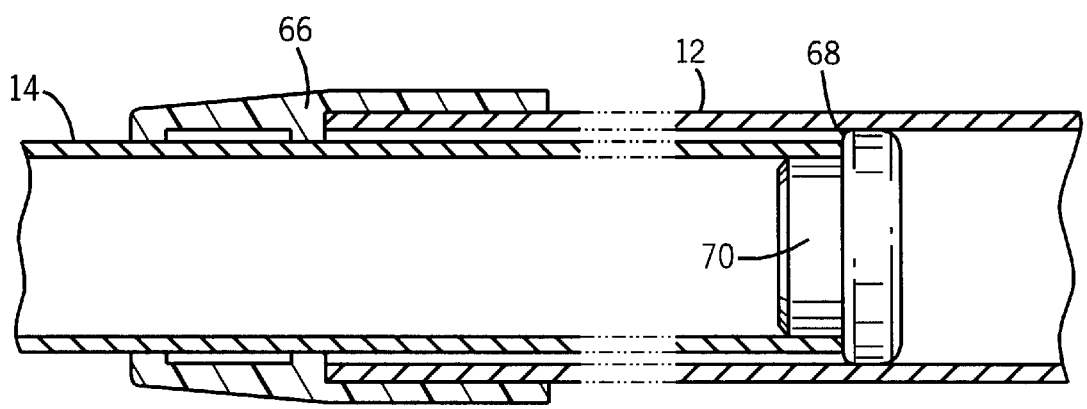
FIG. 13 is a sectional view along the line 13—13 of FIG. 1.

As shown in FIG. 13 outward telescopic movement of inner section 14 within outer section 12 is limited by abutment 66 extending into the interior of section 12 that engages stop 68 disposed on the inner end 70 of section 14.

It is recognized that other equivalents, alternatives, and modifications aside from those expressly stated, are possible and within the scope of the appended claims.

I claim:

1. An elongated multi-purpose truck pole for use in a pick-up truck bed or cab having garment hooks disposed on inner side walls, said pole comprising:

first and second pole sections telescopically connected to each other whereby the overall length of the pole may be adjusted;

locking means to secure said first and second sections in position to maintain a desired pole length;

a first suspension bracket disposed at one end of the pole and a second suspension bracket disposed at the other end of the pole whereby the pole may be hung from the truck's garment hooks; and a cargo arm pivotally attached to one end of the pole and movable between a stored position in which said arm is substantially adjacent and parallel to the pole and a utilitarian position in which said arm extends outwardly and substantially perpendicular to the pole.

2. The multi-purpose truck pole defined in claim 1 further comprising a light disposed in one end of the pole.

3. The multi-purpose pole defined in claim 2 wherein said light and said cargo arm are disposed at the same end of the pole.

4. The multi-purpose truck pole defined in claim 1 further comprising incremental adjustment means for slightly varying the length of the truck pole beyond telescopic adjustment.

5. An elongated multi-purpose truck pole assembly for use in a pick-up truck bed having vertical inner side walls, said pole comprising:

first and second pole sections telescopically connected to each other whereby the overall length of the pole may be adjusted;

locking means to secure said first and second sections in position to maintain a desired pole length;

a cargo arm pivotally attached to one end of the pole and movable between a stored position in which said arm is substantially adjacent and parallel to the pole and a utilitarian position in which said arm extends outwardly and substantially perpendicular to the pole; and incremental adjustment means for slightly varying the length of the truck pole beyond telescopic adjustment.

\* \* \* \* \*